July 4, 1950        S. LOW        2,513,881

TOOL

Filed Sept. 17, 1946

INVENTOR.
Sidney Low.
BY Walter C. Ross
Attorney.

UNITED STATES PATENT OFFICE 2,513,881

TOOL

Sidney Low, Springfield, Mass.

Application September 17, 1946, Serial No. 697,514

1 Claim. (Cl. 29—103)

This invention relates to improvements in tools and is directed more particularly to tools adapted for machining metal objects.

The principal object of the invention is the provision of a tool having a rotatable cutter which is provided with a peripheral cutting edge. The said tool is adapted to engage and act on a rotating piece of work and is arranged so that as the work is being rotated and the tool is fed therealong the cutting member rotates thereby presenting a continuous cutting edge to the work.

According to the prior art a tool having a pointed end is used and in order to obtain production, particularly in connection with harder metals, the point at least of the tool must have the ability to retain insofar as possible a relatively high hardness value at a very high temperature since the single point of the tool is held in contact with the work.

According to this invention, by providing a tool wherein a cutting element is rotatable relative to the work its peripheral cutting edge at any point is in engagement with the work for a short interval of time only wherefor the tendency for the cutting edge to heat up is obviated and therefor the tool not only has a longer life but retains its cutting function or ability to produce the desired accuracy of work in an efficient and speedy manner.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Figure 1:
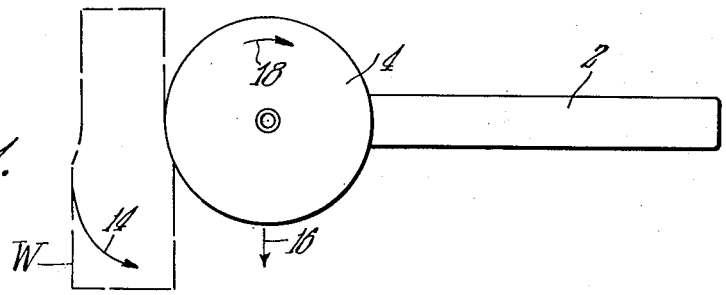
Fig. 1 is a plan view of a cutting tool embodying the novel features of the invention.

Referring now to the drawings more in detail, the invention will now be fully described.

In a general way the tool of the invention includes a shank 2 and a cutting element 4 rotatable relative thereto. The said shank is adapted for securement in a tool post or the like of a lathe or other machine tool so that the cutting element may be disposed adjacent a piece of rotating work.

The cutting element 4 has a sharpened peripheral cutting edge 6 and is provided with a shaft part 8 which is rotatable by means of an antifriction bearing 10 in a head or outer end 12 of the shank. Said cutting element has a part around the shaft 8 which bears on the inner race of the bearing, as shown, whereby end thrust is resisted. The bearing arrangement will be such as to provide free rotation of the cutting element.

Figure 2:
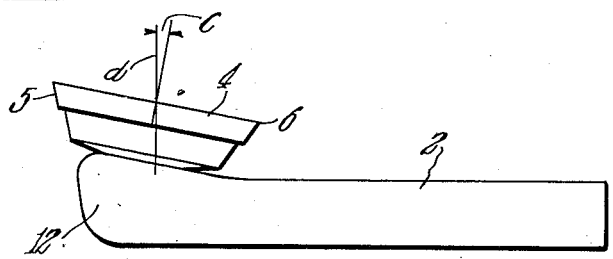
Fig. 2 is a side elevational view of the tool shown in Fig. 1.
Figure 3:
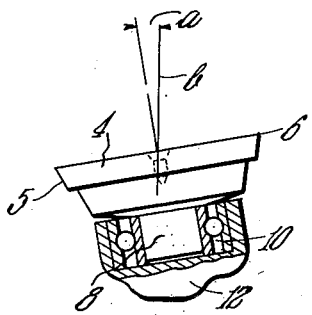
Fig. 3 is an end elevational view of the tool shown in Figs. 1 and 2 with parts thereof in section for clearness.

The peripheral portion 5 of the cutting element 4 extends inwardly and downwardly from the cutting edge similarly to the point of an ordinary cutting or turning tool and the cutting element is rotatable on an axis which is disposed at an angle relative to a vertical plane represented by $b$ which passes through the longitudinal axis of the shank and tool, as shown, in Fig. 3. Also, the axis of rotation of the cutting tool is disposed at an angle represented by $c$ relative to a vertical plane $d$ which is transverse to the vertical plane $b$, as shown in Fig. 2.

The angularity of the axis of rotation of the cutting element is such that the cutting edge of the tool engages the work similarly to the ordinary single pointed tool.

The shank 2 of the tool may be clamped in a tool post of the longitudinal slide of a lathe or the like so that the tool may be moved longitudinally of a piece of work W which is being rotated in the direction of the arrow 14 and as the tool is fed longitudinally of the work in the direction of arrow 16 the cutting element rotates in the direction of the arrow 18 while operating on the work.

Ordinarily, as the tool is fed longitudinally of the rotating piece of work, the cutting element rotates at a speed where its peripheral speed equals or is substantially in agreement with the cutting speed.

Since the cutting element is rotated successive portions of the cutting edge remove stock for short intervals of time therefor the tendency of the edge to heat up and break down is obviated. Tool failure proceeds at a rate proportional to tool point temperature but according to this invention there being no single point it is possible to maintain the temperature of the peripheral cutting edge at a minimum.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claim are therefore intended to be embraced therein.

What it is desired to claim and secure by Letters Patent of the United States is:

A cutting tool structure for use in a lathe toolpost or the like comprising in combination, an elongated shank for securement in a tool-post having a head portion at the forward end thereof and a longitudinal axis, said head provided with a circular socket therein open at an upper side thereof and having a longitudinal axis, the said longitudinal axis of the socket inclining rearwardly relative to a vertical plane disposed transversely and at right angles to a horizontal plane extending through the longitudinal axis of said shank and inclining transversely outwardly relative to a vertical plane extending through the longitudinal axis of said shank, bearing means in said socket, and a cutting tool having a bottom portion disposed on said bearing means for supporting the tool and a depending shaft portion in said journal means for rotation thereof, said cutting tool having an upper flat unobstructed face and a circular cutting edge therearound with sides converging inwardly and downwardly from said cutting edge.

SIDNEY LOW.

REFERENCES CITED

The following references are of record in the file of this patent:

UNITED STATES PATENTS

| Number | Name | Date |
|---|---|---|
| 530,167 | Draper | Dec. 4, 1894 |
| 543,551 | Hartness | July 31, 1895 |
| 1,577,952 | Carnegie | Mar. 23, 1926 |
| 2,233,724 | Bannister | Mar. 4, 1941 |
| 2,289,167 | Bannister | July 7, 1942 |